April 24, 1945.  D. G. CLINE  2,374,420
MOLDING FORM
Filed Aug. 2, 1943
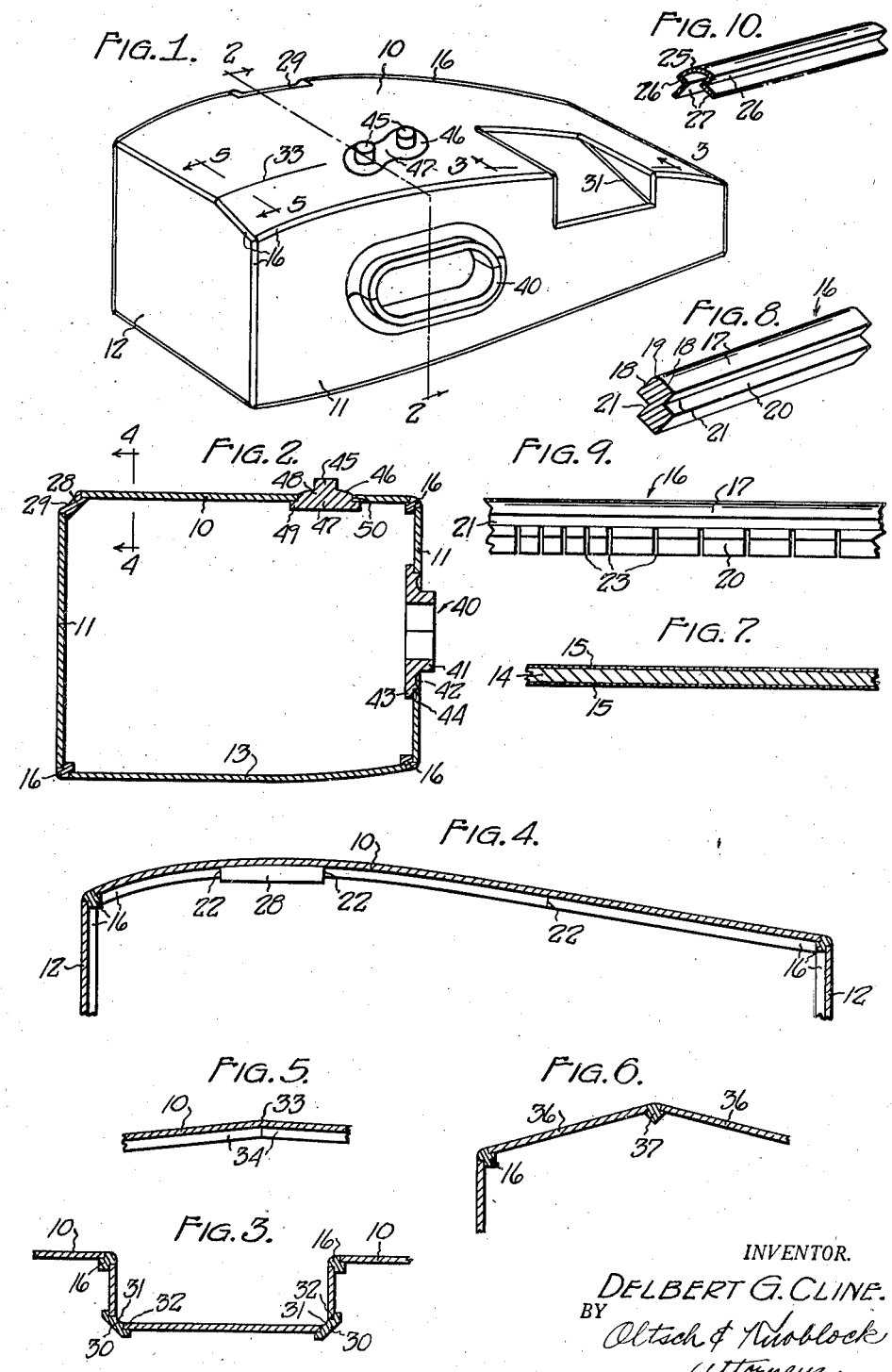
INVENTOR.
DELBERT G. CLINE.
BY
Oltsch & Knoblock
Attorneys.

Patented Apr. 24, 1945

2,374,420

UNITED STATES PATENT OFFICE 2,374,420

MOLDING FORM

Delbert G. Cline, New Castle, Ind., assignor to H. & A. Selmer, Inc., Elkhart, Ind., a corporation of Indiana Application August 2, 1943, Serial No. 497,005

4 Claims. (Cl. 18—45)

This invention relates to improvements in molding forms, and more particularly to forms for molding hollow members of comparatively large size from rubber, synthetic rubber, or like material. One example of the use of such forms is for molding fuel cells for use as liners for the fuel tanks of airplanes, armored cars, tanks, small war boats, or the like.

Fuel cells of this character must be made in different sizes and shapes to fit with accuracy the contours of the receiving chambers therefor or of fuel tanks for which they may form liners, and which differ widely according to their intended use and to their locations in and the structural characteristics, etc. of the machine or vehicle in which said cells are mounted. The wide variety of sizes and shapes which are required make it impractical to use metal molds, which would have to be of sectional construction with provisions for disassembling the same to permit removal thereof from the interior of the molded or finished article. The factors of original cost, labor cost to assemble and disassemble mold sections, and of the great weight which makes manipulation and moving the mold from place to place difficult and which requires the use of heavy-duty hoisting equipment, all prevent the successful use of metal for molds. Other materials preferably readily decomposable materials, such as corrugated paper board, fiber board, molded plaster or gypsum, and combinations of the latter and paper board, have been employed with better results than metal molds, but all of which I am informed have objections. Thus paper board and fiber board molds require extensive interior bracing, are frequently distorted and inaccurate, and cannot be manufactured with requisite uniformity. Molded forms, made from plaster or gypsum, or combinations of the same with paper board, etc., are objectionable because of the cost of the necessary molds therefor, the weight thereof, and the frangible character thereof which makes them subject to breakage and chipping in handling and shipping.

It is the primary object of this invention to provide a molding form which overcomes the objections of the previous forms and retains the advantages of decomposable forms.

A further object is to provide a molding form which is fabricated from normally flat preformed panels of decomposable material which tend to retain their shape but possess at least a small amount of flexibility, interconnected by a plurality of frame members having requisite small radius contours and so secured or assembled with said panels as to maintain desired over-all contour or shape, including curved surfaces, of said form and to be separable upon decomposition or destruction of said panels.

A further object is to provide a molding form having surfaces thereof interrupted by irregular contours, which is fabricated from standard preformed decomposable panels which mount individual contoured elements of requisite size, shape and location to conform to the desired molding shape.

A further object is to provide a molding form fabricated from normally flat preformed destructible panels to provide the faces of the mold and from elongated preformed individual strips interposed between and connected to said panels to form the corners and edges of the molding form wherein the panels are held in requisite curvature and braced by said strips and said strips are held in proper place and requisite curvature and are braced by said panels.

Other objects will be apparent from the description, drawing and appended claims.

In the drawing:

Fig. 1 is a perspective view of a molding form.

Fig. 2 is a transverse sectional view taken on line 2—2 of Fig. 1.

Fig. 3 is a fragmentary detail sectional view taken on line 3—3 of Fig. 1.

Fig. 4 is a fragmentary detail sectional view taken on line 4—4 of Fig. 2.

Fig. 5 is a fragmentary detail sectional view taken on line 5—5 of Fig. 1.

Fig. 6 is a fragmentary detail sectional view illustrating a mold condition similar to that shown in Fig. 5, but embodying a modified construction.

Fig. 7 is a fragmentary sectional view illustrating one type of panel material which may be used in fabricating the mold.

Fig. 8 is a fragmentary perspective view of one form of molding strip.

Fig. 9 is a fragmentary side elevation of another type of molding strip.

Fig. 10 is a fragmentary perspective view of a third type of molding strip.

Referring to the drawing, which illustrates the preferred embodiment of the invention, the numeral 10 designates the top wall, 11 the side walls, 12 the end walls, and 13 the bottom wall of a molding form. These walls are formed, shaped or cut in desired perimetric outlines from any suitable preformed panel material which possesses the following properties: normal shape retention, at least a small measure of flexibility, and a reasonable measure of strength, and which are either frangible, decomposable when subjected to hot water, or susceptible of breakage or destruction while dry, as along score lines. Different types of commercially available materials possess these properties in varying degrees and are suitable for use, among which are plaster board or gypsum board, fiber board or composition board such as that known in the trade as "Celotex" and "Insulite," and corrugated paper board. The last named material may require lamination of multiple sheets thereof into a multiple thickness panel to provide the requisite strength. It will be understood, of course, that the above list of materials is simply illustrative, and not limiting. I prefer to use the material known as plaster board or gypsum board, which is composed of a body or layer 14 of plaster, gypsum, cement or like material and surfacing sheets or liners 15 of paper or the like at the opposite faces thereof, as illustrated in Fig. 7. Plaster board of a thickness of approximately ¼ or ⅜ inch possesses all the required properties mentioned above and in addition a certain amount of workability when moistened, which property of workability is particularly valuable in the fabrication of forms of some shapes which are frequently required, such as forms having ridged contours or reversely curved faces of slightly smaller radius than that to which the panel material can normally be flexed, but of larger radius than can conveniently or economically be provided by inserts, and the like.

The various panels are interconnected by frame strips 16 which form the edges and corners of the molding form. The strips may be formed in various sizes and shapes and from different materials, such as wood, metal, plaster or gypsum, or from thermo-plastic materials whose plasticizing temperature or softening point exceeds the temperature at which the article to be molded is cured, dried or otherwise processed. One form of the strip is shown in Fig. 8, wherein the cross-sectional shape of the strip is illustrated as comprising an outer portion 17 having converging faces 18 merging with an intermediate transversely curved face portion 19, an inner portion 20, and V-shaped grooves 21 in the opposite sides of the strip and having one face perpendicular to and the other face parallel to the adjacent face 18. The grooves 21 are of a depth or size to receive the margins of adjacent panels with the outer panel faces flush with faces 18 and with the panel edges firmly abutting the groove wall defining one inner face of the outer strip portion 17. When properly positioned, the panels and strips are interconnected by means of glue, sodium silicate, nails or other suitable means, although the use of an adhesive is preferred. In such assembly, the ends of the strips simply abut, as at mitered end edges, ship-lap joints, finger joints, or the like, and preferably are not secured together to form a unitary frame, but are held in proper assembled relation by the panels to which they are secured. Joints between the strips should preferably be capable of disassembly or of breakage so that the individual component pieces or strips are easily separable upon decomposition or breakage of the panel material. Also, to facilitate removal of the strips from the article molded on the forms, it is preferred that at least the strips along the longitudinal dimension of the form should be of sectional character as illustrated in Fig. 4. Edge abutting joints 22 between said strip sections or between the same and other framing units to be described hereinafter are illustrated in Fig. 4 though other types of joints, such as finger joints, may be used. Danger of damaging or puncturing the molded article during removal of the strips is eliminated by such sectional construction, since short units or sections thereof can be manipulated and removed through small hand holes in the molded article quite easily.

It is essential that the corner of edge strips possess a certain degree of longitudinal flexibility, whereas the cross-sectional shape of the strips described above tends to impart rigidity thereto. The requisite flexibility can be provided by forming transverse kerfs 23 in the inner portion 20 of the strips as shown in Fig. 9. Such kerfs may be spaced uniformly along the strip or a plurality thereof may be comparatively close spaced at points requiring increased curvature or comparatively sharp bending.

An alternative form of strip, especially adapted for fabrication from metal, is shown in Fig. 10. This form entails transverse bending or forming of sheet stock to provide a central portion 25 of requisite transverse shape and curvature, web portions 26 preferably substantially perpendicular to the margins of portion 25 or to the tangents of said margins, and flanges 27 projecting laterally perpendicularly outwardly from said webs. A strip of this character may possess requisite flexibility, or its flanges and webs may be transversely slitted along its full length or at selected portions only to increase its flexibility.

The strips may be of different cross-sectional configurations as illustrated in Fig. 2, wherein the upper right hand corner strip presents a curved surface of larger radius than the lower left hand corner strip, and wherein the lower right hand corner strip joins panels whose marginal portions converge at an obtuse angle. The upper left hand corner strip 28 in Fig. 2 is of a configuration to provide a beveled corner 29, also shown in Fig. 1, and which extends for only a small portion of the length of the molding form. Strip 28 must be shaped at its outer face to give the desired corner contour, including the contour which merges with the contour of the rounded corner strips at the ends thereof, and also must have the V-shaped grooves to receive the edges of the adjacent panels. Also, it may be necessary to provide the molding form with indented or inset portions as shown at the right in Fig. 1 and also as shown in Fig. 3. Concave corners at such indents or at valleys can be provided by strips 30 having concave curved faces 31 and V-shaped panel receiving grooves 32 at opposite sides of said faces.

Sometimes a panel must be ridged, as at 33 in Fig. 1. If this ridge is not too abrupt to permit bending of the panel to shape the same, it can be constructed as shown in Fig. 5, wherein the frame strips 34 at the edge of the panel transverse of the ridge abut at said ridge. A sharper ridge may require the construction shown in Fig. 6, wherein the ridged face of the molding form is made from two panels 36 having a strip 37 interposed therebetween, to extend along and define or shape the ridge.

Many other possibilities exist for combining panels and strips to provide for different shapes of the molding form, but it is believed that these possibilities will be apparent from the combinations described and illustrated, of which they are merely variants.

A further important feature of the invention is its adaptability for molds having comparatively small contoured portions within the outline of one or more faces thereof. Two illustrations of such contoured portions are shown in Figs. 1 and 2. Thus, assume that the mold must provide for shaping of a neck around a hand hole, with an indented or inset portion of the wall of the molded article encircling such a neck. For such a shape or contour, the wall of the mold may have an opening cut therein at the outer margin of the desired indented portion. Within this opening a sectional insert 40 may be suitably secured, as by an adhesive. The insert sections may either be molded from thermo-plastic material, plaster, gypsum, etc., or may be carved, milled or otherwise shaped or machined from wood or metal. The insert includes a main body portion of desired contour, for example neck portion 41 and concave molding face portion 42, upon which the contoured portion of the molded article is to be formed, and a rearwardly off-set marginal flange 43 adapted to bear against the rear face of the panel, as 11, which mounts the same. The wall 44 between the body portion and flange 43 fits snugly in the opening in panel 11, so that the outer face of said panel will merge with molding face portion 42. The parting plane between the sections of the insert 40 preferably extends parallel to the major dimension of said insert.

Another condition is illustrated by the contoured portion in the top wall of the molding form, which may include a pair of small necks 45 each surrounded by convex portions 46 which merge with each other. If the size of such a contoured portion is small, it may be formed in a one part insert 47 mounted in the top wall 10 as shown in Fig. 2. Insert 47 has body portion 48 of the desired molding contour, a marginal rearwardly off-set flange 49, and a wall 50 between the same to fit snugly in a receiving opening in the panel 10, and is adhesively secured to said panel, all as described above relative to the sidewall insert 40.

From the above description it wil be apparent that the instant molding form posesses requisite strength for its purpose because of the mutually bracing action of the strips and the panels, can be fabricated in any shape or contour and will hold that shape, is light in weight, can be decomposed, broken or otherwise destroyed for quickly cleaning out the interior of the article molded therearound, is comparatively inexpensive, and requires very little internal bracing to maintain its desired shape. The framing strips separate or may be separated when the panels are decomposed or broken, and therefore can be manipulated and removed from the molded article easily, quickly and without breakage. These strips hold the critical contours of the molding form within specified tolerances, particularly at edges and corners. Also, the strips and contoured inserts can be made from non-decomposable or comparatively permanent material, which permits their re-use with new panels, and hence substantially reduces cost for molds used in substantial quantities.

I claim:

1. A molding form comprising a plurality of plaster board panels and a plurality of wood strips, said strips having V-shaped grooves at opposite sides thereof in which the margins of adjacent panels are adhesively secured to provide a hollow structure, the outermost surface of said strips between said grooves being transversely contoured to define the corners and edges of said form.

2. A molding form as defined in claim 1, wherein said strips have a plurality of spaced transverse kerfs in the inner portion thereof to impart flexibility thereto.

3. A hollow molding form having a comparatively small contoured portion in one wall thereof comprising a plurality of strong normally flat readily destructible panels, a plurality of elongated edge and corner defining strips of a different material interposed between and secured only to said panels, one panel having an opening therein, and an insert fitting in said opening and having an exposed surface forming said contoured portion, said insert having a marginal flange secured to said panel and bearing against the inner face thereof around said opening.

4. A hollow molding form comprising a plurality of preformed paperboard panels, said panels having predetermined perimetric outlines, and a plurality of elongated wood strips of configured cross-section having longitudinal grooves at opposite sides thereof, said strips receiving and being secured to the marginal portions of adjacent panels at said grooves to form a self-suporting hollow unit and each having a surface of predetermined configuration exposed between said panels and merging with the margins of the outer faces of said panels.

DELBERT G. CLINE.